United States Patent [19]

Enomoto

[11] Patent Number: 4,762,352

[45] Date of Patent: Aug. 9, 1988

[54] SYNTHETIC RESIN BUMPER ASSEMBLY

[75] Inventor: Koji Enomoto, Utsunomiya, Japan

[73] Assignee: Honda Giken Kogyo Kabushiki Kaisha, Tokyo, Japan

[21] Appl. No.: 934,891

[22] Filed: Nov. 25, 1986

[30] Foreign Application Priority Data

Nov. 29, 1985 [JP] Japan .................................. 60-267291

[51] Int. Cl.$^4$ ............................................. B60R 19/02
[52] U.S. Cl. ..................................... 293/120; 293/122
[58] Field of Search ............... 293/102, 109, 120, 121, 293/122, 1

[56] References Cited

U.S. PATENT DOCUMENTS

| | | | |
|---|---|---|---|
| 3,829,141 | 8/1974 | Igwe | 293/122 X |
| 3,866,963 | 2/1975 | Weller | 293/120 |
| 4,106,804 | 8/1978 | Scrivo | 293/121 X |
| 4,348,042 | 9/1982 | Scrivo | 293/120 |
| 4,408,790 | 10/1983 | Shimoda et al. | 293/122 |
| 4,457,547 | 7/1984 | Sekiyama et al. | 293/120 X |

FOREIGN PATENT DOCUMENTS

| | | | |
|---|---|---|---|
| 1059554 | 7/1979 | Canada | 293/120 |
| 2344686 | 3/1975 | Fed. Rep. of Germany | 293/120 |
| 2408762 | 8/1975 | Fed. Rep. of Germany | 293/122 |
| 2513024 | 10/1976 | Fed. Rep. of Germany | 293/121 |
| 2927036 | 1/1981 | Fed. Rep. of Germany | 293/120 |

Primary Examiner—Robert B. Reeves
Assistant Examiner—Russell D. Stormer
Attorney, Agent, or Firm—Armstrong, Nikaido, Marmelstein & Kubovcik

[57] ABSTRACT

A bumper for a motorcar having a shock absorbing member made of a foamed synthetic resin attached to a front surface of a backup beam connected to left and right stays of a car body. The resultant assembly of those members is covered at its front, upper and lower surfaces with a synthetic resin facing member which is nearly in the form of a channel in section. The backup beam is formed out of fiber-reinforced synthetic resin and is a hollow beam member having depth which is comparatively large at its middle portion extending between the two stays and is comparatively small at its both end portions extending from the two stay connecting portions thereof to the terminal ends thereof. The shock absorbing member is formed so that the change in the depth thereof is in inverse relation to the foregoing change in the depth of the backup beam so that the depth of the entire resultant assembly may nearly constant. The backup beam can be made of a channel-shaped front shell member and a channel-shaped rear shell member which are joined together at their flanges to be formed into a hollow beam.

3 Claims, 2 Drawing Sheets

SYNTHETIC RESIN BUMPER ASSEMBLY

BACKGROUND OF THE INVENTION

This invention relates to a synthetic resin bumper for a motorcar.

A conventional bumper has been known having a shock absorbing member made of a foamed synthetic resin and a backup beam made of a soft steel plate. The backup beam is a hollow beam member with a constant depth. The shock absorbing member has either a constant depth along its entire length or is largest at the middle part thereof. The shock absorbing member is attached to a front surface of the backup beam (Japanese Patent Kokai Sho No. 55-79726, Japanese Utility Model Kokai Sho No. 55-53645). It has been usual with this type bumper that the shock absorbing member is arranged to be sufficiently shock absorbing that, even when a pendulum strikes a blow at the same at a speed of below 8 km/h, the absorbing member can prevent the backup beam from permanently deforming.

Thus, when such a foamed material as polypropylene, polyurethane or the like is used for making the shock absorbing member having the foregoing degree of shock absorption, the foaming ratio of the foam material has to be restrained to a comparatively low value. Consequently, the resultant foam product becomes comparatively large in weight. In addition, the backup beam thereof is also comparatively large in weight because the same is made of a steel material. This results in the problem that the bumper is large in weight, resulting in increase in consumption of fuel of the vehicle on which it is mounted.

OBJECT AND SUMMARY OF THE INVENTION

This invention has for its object to provide a comparatively light in weight replacement for the conventional bumper. In acheiving this and other objects, a synthetic resin bumper for a motorcar is provided having a shock absorbing member made of a foamed synthetic resin attached to a front surface of a backup beam connected to left and right stays of a car body. The resultant assembly of these members is covered at an outer front, upper, and lower surfaces thereof with a synthetic resin facing member which is nearly in the form of a channel in section. The backup beam is formed out of a fiber reinforced synthetic resin into a hollow beam member having a depth which is comparatively large at its intermediate region extending between the two stays and comparatively small at its both end regions extending from the two stay connecting portions thereof to the terminal ends thereof. The shock absorbing member is formed so that the change in its depth is in an inverse relation to the foregoing change in depth of the beam so that the depth of the resultant assembly may be nearly constant along its entire length.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
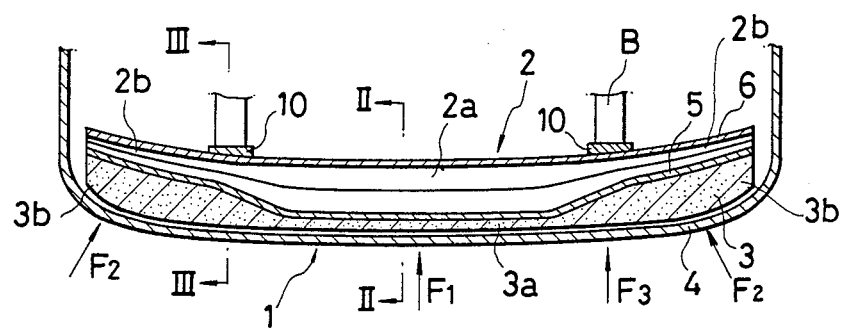
FIG. 1 is a sectional top plan view of one embodiment of this invention.
Figure 2:
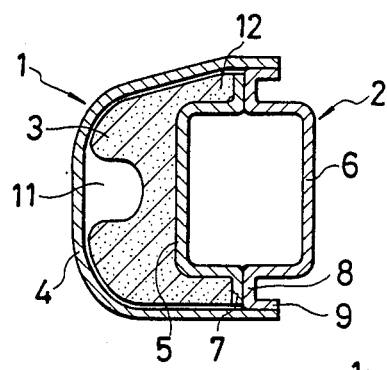
FIGS. 2 and 3 are sectional views thereof taken along the lines II—II and III—III, respectively, in FIG. 1.
Figure 3:
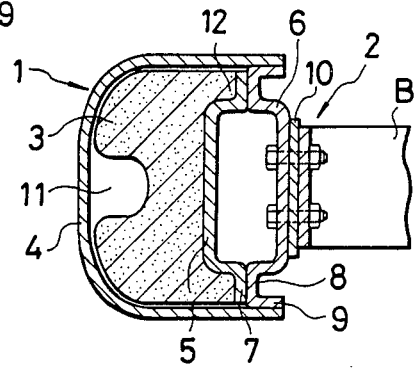

One embodiment of this invention will now be explained with reference to the accompanying drawings:

Referring to the drawing, a bumper 1 comprises a backup beam 2, a shock absorbing member 3 and a facing member 4. Such a bumper can be attached to either of the front or rear portions of a motorcar A. The front bumper and the rear bumper are substantially identical to each other in construction, operation and effect, so that an explanation only about the front bumper will be made. It should be understood the rear bumper would be substantially the same.

The backup beam 2 is made of a fiber reinforced plastic (FRP) material such as fiber reinforced polypropylene material or the like. The beam 2 has hollow portion extending along its entire length which is prepared by joining together a channel-shaped front shell member 5 and a channel-shaped rear shell member 6 at their flanges 7, 8. The rear shell member 6 is provided with a facing member attaching edge 9 formed by bending of the flange 8 and a stay connecting portion 10 for connection to each of right and left stays B of a car body.

The shock absorbing member 2 is a molded one prepared by foaming such a resin as polypropylene, polyurethane or the like, and is provided at the centerline of the front surface therof with a laterally extending groove 11 so that resilient deformation thereof may be facilitated and the weight thereof may be decreased. In addition, the member 3 is provided on its rear surface with upper and lower projection edges 12, 12 for being mounted on the front shell member 5. The facing member 4 is nearly in the form of a channel in section, and is made of such a synthetic resin as polypropylene or the like, and is adhered at its upper and lower end edges to the facing member attaching edges 9, 9 of the beam 2.

The depth of the backup beam 2 and the depth of the shock 1 absorbing member 3 are as shown in FIG. 1. Namely, the backup beam 2 is formed that the depth thereof may be the largest at its middle portion 2a, and may be gradually decreased towards its stay connecting portions 10, and further may be nearly constant at its both end portions 2b ranging from its portions facing the stay connecting portions 10 to its terminal ends. On the other hand, the shock absorbing member 3 is formed so that the depth thereof may be the smallest at its middle portion 3a and may be gradually increased towards its stay connecting portions 10, and further may be nearly constant at its both end portions 3b ranging from its portions facing the stay connecting portions 10 to its terminal ends, so that the depth of the entire resultant assembly of the two members 2 and 3 is nearly constant at every part thereof.

The backup beam 2 is made of the fiber reinforced plastics as mentioned above, and therefore is more difficult to plastically deform and is more resilient than the conventional one made of the soft steel material. Consequently the inventive backup beam performs a shock absorbing action more as a resilient member.

Additionally, the middle portion 2a of the backup member which is liable to undergo the maximum bending when a shock is applied to the intermediate region between the two stay connecting portions 10, 10 thereof is made to have the largest depth so that it is the strongest portion of the beam. This results in a uniform stress over the whole of the middle portion 2a when such a shock is applied and accordingly any local deformation thereof can be prevented.

Figure 4:
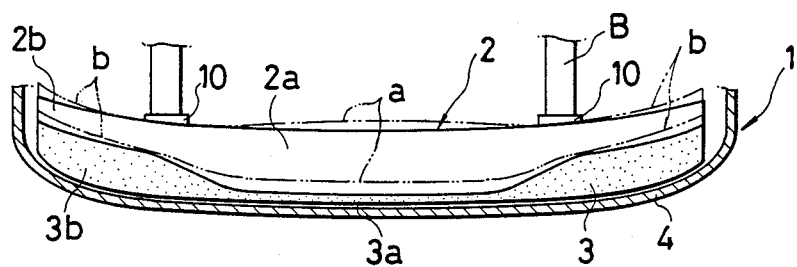
FIG. 4 is an explanatory diagram for explaining a shock absorbing action thereof.
Figure 5:
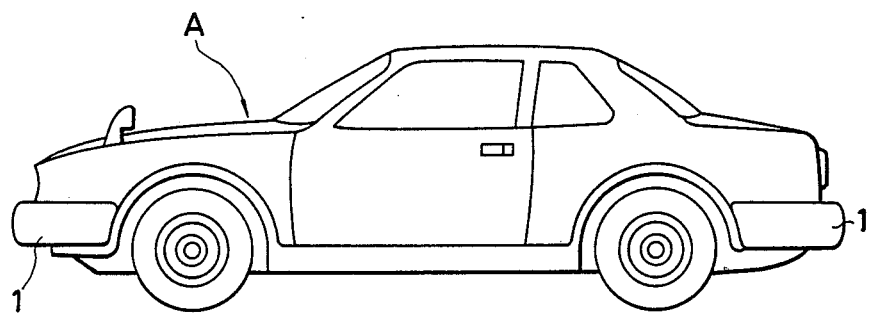
FIG. 5 is a side view of a motorcar provided with this invention.

When, for instance, a force $F_1$ is applied to the middle portion 2a of the backup beam, the intermediate middle portion of the backup beam 2 is liable to be subjected to resilient bending deformation as shown by imaginary lines a in FIG. 4, so the shock is absorbed by this resilient deformation. On this occasion, the middle portion 3a of the shock absorbing member 3 also has a shock absorbing capacity, though the shock absorbing action thereof is smaller than that of each end portion 3b thereof, so that by this shock absorbabilty, the same performs a shock absorbing action for the car body and a shock absorbing action for preventing local damage of the portion of the front shell member 5 which is hit.

If a shock force $F_2$ is applied to the end portion of the bumper 1, the end portion 2b of the backup beam 2 is resiliently deformed, as shown by imaginary lines b in FIG. 4, to absorb the shock, and performs, together with the end portion 3b of the shock absorbing member 3, a shock absorbing action. Also in this case, the backup beam 2 absorbs the shock by a resilient action thereof.

When, however, a shock is applied toward the stay B, that is, when a shock force $F_3$ as shown in FIG. 1 is applied, a shock absorbing action resulted from the resilient action of the backup beam 2 is slight one caused only by a deformation of the front shell member 5, and accordingly shock absorbing action at that part depends largely on the shock absorbing action caused by compression of the end portion 3b of the shock absorbing member 3 so that such shock absorption is nearly equal to the shock absorbing action in the conventional example.

Thus, according to this invention, the bumper is decreased in weight because the amount of foamed resin of the middle portion of the shock absorbing member 3 is decreased and because the backup beam 2 is made of fiber reinforced synthetic resin. As a result, the weight of the motorcar can be decreased and the consumption of the fuel can be decreased. Additionally, a shock absorbing action corresponding to the decrease in amount of the shock absorbing member is compensated by the resilient action resulting from the resilient deformation of the backup beam 2, so that a good function or performance of the shock absorbing bumper can be maintained.

It is readily apparent that the above-described synthetic resin made bumper assembly meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A bumper for a motorcar comprising:
   a backup beam formed of a hollow beam member and having a depth, a length, a front surface, a back surface, portions on said back surface for mounting to left and right stays of the motor car, a middle portion extending between the mounting portions, terminal ends, and end portions extending between said middle portion and said terminal ends,
   a shock absorbing member made of a foamed synthetic resin attached to said front surface of said backup beam and having a depth, and
   a facing member made of synthetic resin having a channel-shaped cross-section and covering front, upper, and lower surfaces of said shock absorbing member and said backup beam;
   said backup beam being made of a composite fiber-reinforced synthetic resin material;
   said depth of said backup beam being comparatively large at said middle portion and comparatively small at said end portions;
   said depth of said shock absorbing member being in inverse relation to said depth of said backup beam such that a combined depth of said shock absorbing member and said backup beam may be nearly constant along the entire length thereof.

2. The bumper as claimed in claim 1, wherein said backup beam comprises a channel-shaped front shell member having flanged and a channel-shaped rear shell member having flanges together at said flanges to form said hollow beam member.

3. The bumper as claimed in claim 1, wherein a front surface of said shock absorbing member is provided with a laterally extending groove along a centerline thereof.

* * * * *